United States Patent [19]
Hamaguchi et al.

[11] Patent Number: 5,602,663
[45] Date of Patent: Feb. 11, 1997

[54] INFORMATION PROCESSING APPARATUS FOR MULTIPLEX TRANSMISSION OF SIGNAL FOR ARBITRATION AND SIGNAL FOR DATA TRANSFER

[75] Inventors: Kazumasa Hamaguchi, Yokohama; Atsushi Date, Tokyo; Masato Kosugi, Yokohama; Toshiyuki Fukui, Kawasaki, all of Japan

[73] Assignee: Canon Kabushiki Kaisha, Tokyo, Japan

[21] Appl. No.: 341,877

[22] Filed: Nov. 15, 1994

[30] Foreign Application Priority Data

Nov. 16, 1993 [JP] Japan ................................. 5-286876

[51] Int. Cl.⁶ ........................................ H04J 14/02
[52] U.S. Cl. ......................... 359/125; 359/120; 359/136
[58] Field of Search ................................. 359/117, 120, 359/121, 125, 128, 137, 139, 136; 370/60.1, 85.2, 94.3; 395/200.1, 200.13, 200.2

[56] References Cited

U.S. PATENT DOCUMENTS

| | | | |
|---|---|---|---|
| 4,700,344 | 10/1987 | Kaiho et al. | 359/136 |
| 4,701,909 | 10/1987 | Kavehrad et al. | 359/136 |
| 5,020,020 | 5/1991 | Pomfret et al. | 395/200.13 |
| 5,208,692 | 4/1993 | Mc Mahon | 359/128 |
| 5,452,115 | 9/1995 | Tomioka | 359/123 |
| 5,521,732 | 5/1996 | Nishio | 359/120 |

FOREIGN PATENT DOCUMENTS 03308890  3/1989  European Pat. Off. ........ H04L 11/16

OTHER PUBLICATIONS

IEEE Communications Magazine, vol. 27, No. 10, Oct. 1989, pp. 27–35, Matthew S. Goodman, "Multiwavelength Networks and New Approches to Packet Switching".

Supercomm/ICC '92, vol. 2, Jun. 14, 1992, pp. 824–828, A. E. Willner et al., "Comparison of Central and Distributed Control in a WDMA Star Network".

I.E.E.E. International Conference on Communications '89, vol. 1, Jun. 11, 1989, pp. 162–170, S. C. Liew et al., "A Broadband Optical Local Network Based on Multiple Wavelengths and Multiple RF Subcarriers".

IEEE Journal on Selected Areas in Communications, vol. 8, No. 6, Aug. 1990, pp. 948–964, Charles A. Brackett, "Dense Wavelength Division Multiplexing Networks: Principles and Applications".

Cheng et al, "A Distributed Star Network Architecture for Interoffice Applications", Journal of Kightwave–Technology vol. LT–4, No. 7, Jul. 1986.

Arthurs et al, "A Broadband Opteelechonk Pailut Switching Systems", IEEE Transactions on Communication, Jun. 1986 No. 6 pp. 645–648.

Fioretti et al, "A Novel Distributed Photonic Switch" Proceedings of the international Switching Symposium Jun. 1, 1990 vol. 1 pp. 147–152.

Kazovsky et al, "Starnet: A Multi–gigabit–per–second Optical LAN Utilizing a Passive WOM Star", Journal of Lightwave Technology, vol. 11 No. 5/6 May/Jun. 1993 pp. 1009–1027.

Ramaswami, "Multiwavelength Lightwave Networks for Computer Communication", IEEE Communications Mag Feb. 1993 pp. 78–88.

*Primary Examiner*—Wellington Chin
*Assistant Examiner*—Rafael Bacares
*Attorney, Agent, or Firm*—Fitzpatrick, Cella, Harper & Scinto

[57] ABSTRACT

An information processing apparatus has a plurality of computational nodes including a multiplexer and a demultiplexer. A concentrator is connected to the nodes and simultaneously transmits multiplexed signals thereto. An arbiter arbitrates the use of a transmission line for data transfer, with the arbitration and data transfer signals being multiplexed.

3 Claims, 9 Drawing Sheets

INFORMATION PROCESSING APPARATUS FOR MULTIPLEX TRANSMISSION OF SIGNAL FOR ARBITRATION AND SIGNAL FOR DATA TRANSFER

BACKGROUND OF THE INVENTION

1. Field of the Invention

The present invention relates mainly to an information processing apparatus such as a parallel computer system consisting of a plurality of computational nodes interconnected in a star-shaped configuration using a star coupler.

2. Related Background Art

There are two conventional methods for each computational node to use an interconnected network in a parallel computer system employing the star-shaped topology for the interconnected network: a method without performing an arbitration operation (or without providing an arbiter), in which individual computational nodes each check circumstances of use of transmission line (whether it is open or not), and a node uses the transmission line if it is open, but continues checking whether any collision is caused in the transmission line, if it is in use; or a method with an arbiter, in which a signal line for arbitration in the interconnecting network is stretched between each computational node and the arbiter, the arbiter performs arbitration to avoid any collision in the transmission line in response to requests for use of the interconnecting network from the individual computational nodes, and the computational nodes each use the transmission line, based on authorization of use from the arbiter.

Among the above conventional examples, the method without an arbiter, however, needed means for checking if the transmission line is open or not, means for detecting occurrence of collision, recovery means in detection of collision, etc., which caused a drawback that processing or apparatus became complex.

On the other hand, the method with an arbiter for arbitration had a problem in respect of the number of connecting lines between the computational nodes and the arbiter. Especially in the case of the star-shaped interconnecting network, the arbiter was normally located at the center of connecting network and therefore signal lines for arbitration and signal lines for actual data transfer were needed between the individual computational nodes and the center of connection network, which increased the number of connection lines. In order to avoid an increase in number of connection lines, there is a method employing the packet transmission method for data transfer, thereby reducing the number of signal lines (connection lines) for actual data transfer. Even with this method, double interconnections for data transfer and for arbitration were required between the respective computational nodes and the center of connection network.

SUMMARY OF THE INVENTION

For solving the above problems, the present invention provides the following information processing apparatus.

Namely, provided is an information processing apparatus having a plurality of computational nodes, comprising:

a plurality of computational nodes, each computational node being provided with at least one wavelength multiplexer for multiplexing signals of a plurality of wavelengths and simultaneously transmitting the multiplexed signals and at least one wavelength demultiplexer for demultiplexing the transmitted signals in the plurality of wavelengths; and a concentrator connected through a transmission line medium with each of said plurality of computational nodes, said concentrator comprising, a wavelength demultiplexer for demultiplexing the signals of the plurality of wavelengths transmitted through said wavelength multiplexer from each of said plurality of computational nodes;

a wavelength multiplexer for multiplexing signals of the plurality of wavelengths and simultaneously transmitting the multiplexed signals to each of said plurality of computational nodes;

connecting means for connection of a signal for data transfer between said plurality of computational nodes connected with each other; and an arbiter for performing an arbitration operation for use of the transmission line in said data transfer;

wherein a signal for arbitration for use of the transmission line transmitted between said computational nodes and the arbiter and the signal for data transfer between the computational nodes are transmitted in a multiplexed manner on said transfer line medium.

DETAILED DESCRIPTION OF THE PREFERRED EMBODIMENTS

Embodiment 1

Figure 1:
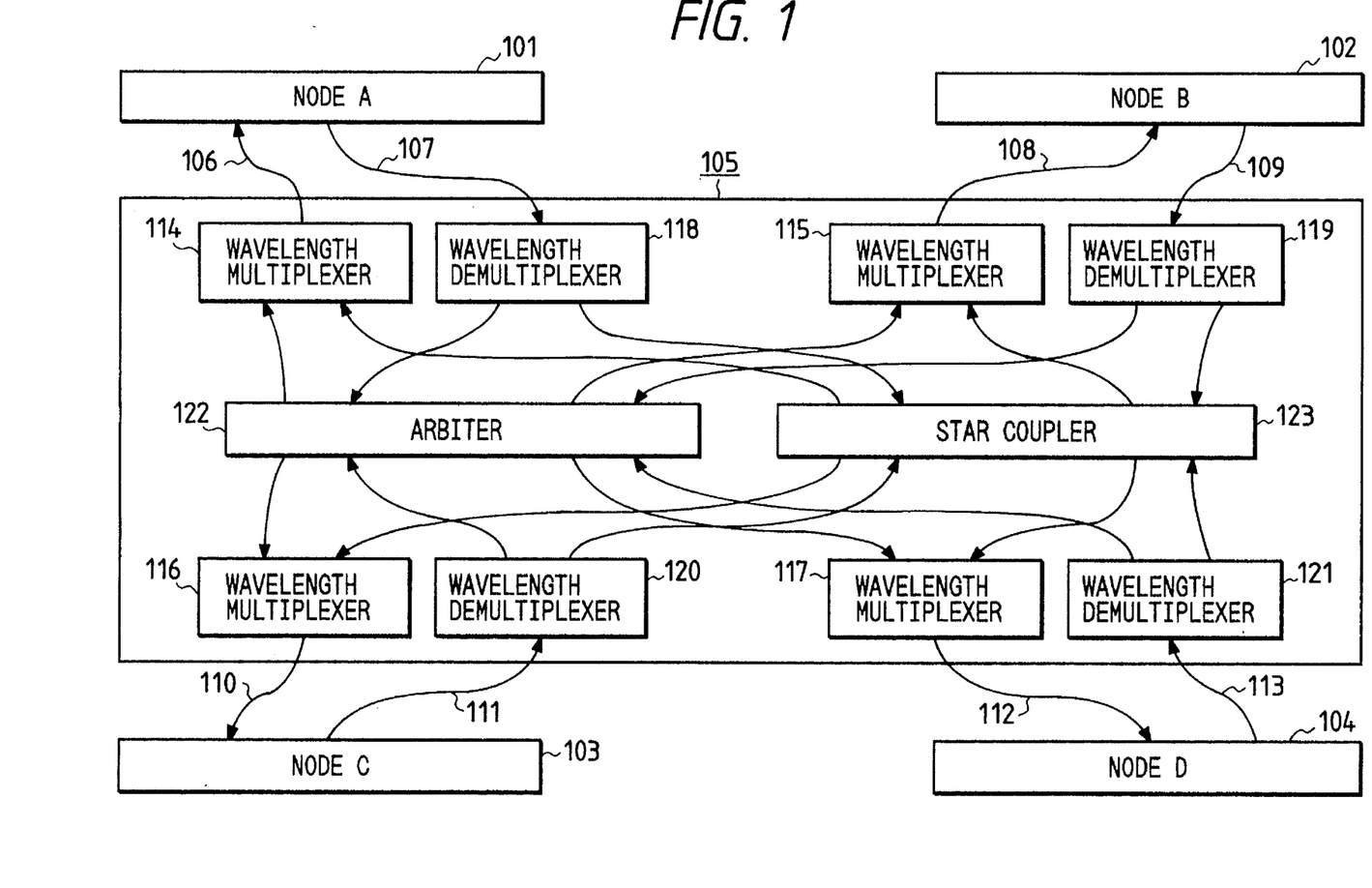
FIG. 1 is a block diagram of a system according to the present invention.

FIG. 1 is a drawing to show the structure of a system according to the present invention. Reference numerals 101, 102, 103, 104 designate computational nodes, 105 a concentrator connecting the nodes with each other, and 106, 107, 108, 109, 110, 111, 112, 113 optical fiber cables for connecting the respective nodes with the concentrator. Numerals 114, 115, 116, 117 denote wavelength multiplexers each for multiplexing an arbitration wavelength and a data transfer wavelength, and 118, 119, 120, 121 wavelength demultiplexers each for demultiplexing an optical signal of wavelength-multiplexed input from an associated node, into the arbitration wavelength and the data transfer wavelength. Numeral 122 is an arbiter. Numeral 123 denotes an optical star coupler constituting means for connection of signal for data transfer between a plurality of nodes connected with each other.

Figure 2:
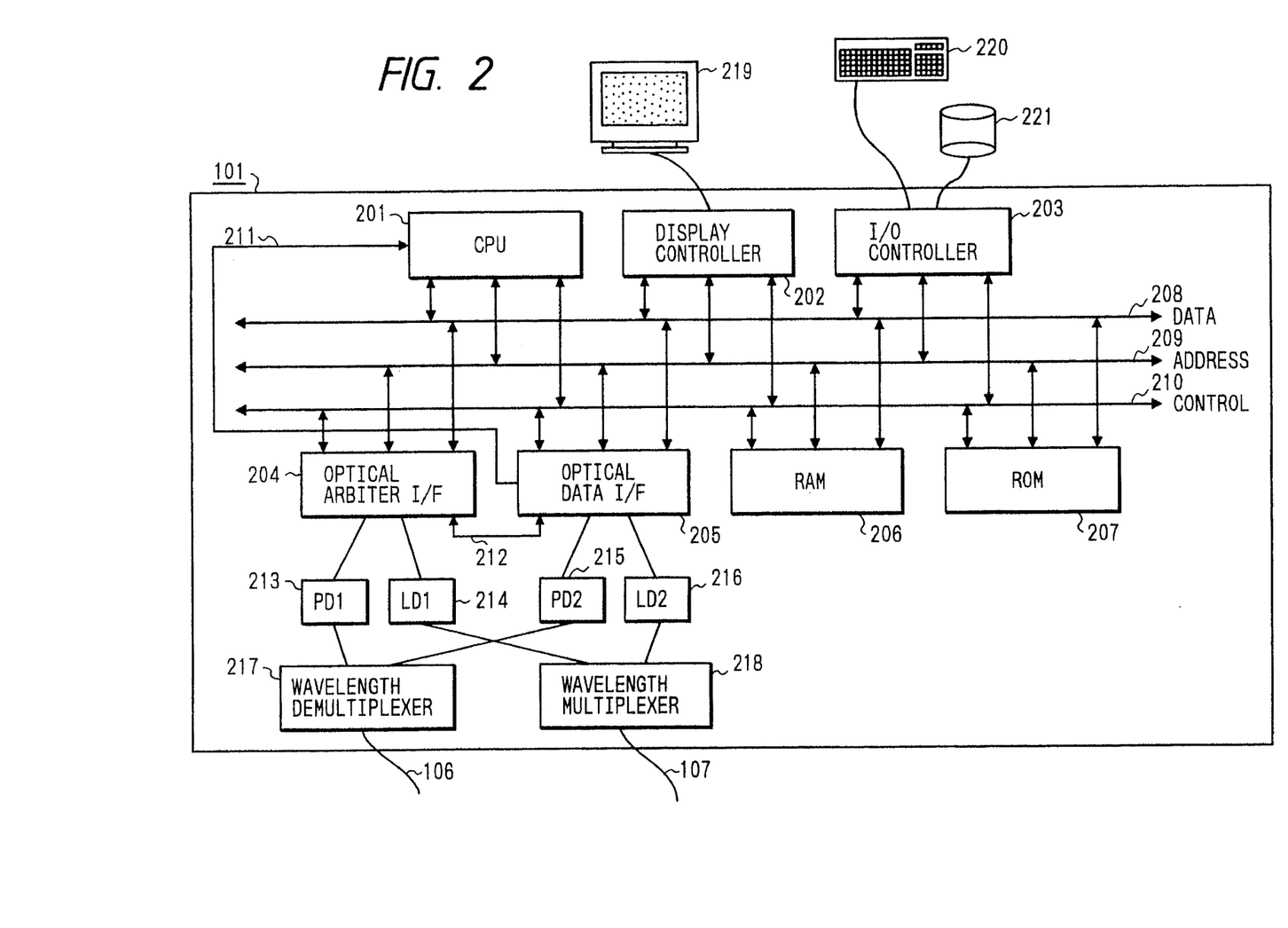
FIG. 2 is a block diagram of a computational node.

FIG. 2 is a drawing to show a computational node. Numeral 101 designates a node A in FIG. 1. Also, node B, node C, and node D have the same structure. Numeral 201 denotes a processor in the computational node to execute various information processing procedures using a display controller 202, an I/O controller 203, etc., based on program or data stored in RAM 206 or ROM 207, which is the general structure for general-purpose computers without any limitations by the present invention. Numeral 208 is a data bus in the computational node, 209 an address bus in the node, and 210 a control bus in the node. These buses are under arbitration by a bus arbitration function of the processor 201 and are used for transfer of data by the processor 201 and an optical data interface 205. Numeral 204 is an optical arbiter interface. Numeral 205 is an optical data interface. Numerals 213, 215 denote variable-wavelength photodiodes, and 214, 216 variable-wavelength laser light-emitting devices. Numeral 217 is a wavelength demultiplexer for demultiplexing an optical signal of input from the concentrator, into the arbitration wavelength and the data transfer wavelength. Numeral 218 is a wavelength multiplexer for multiplexing optical signals of different wavelengths emitted from 214 and 216. Numerals 106, 107 denote optical fiber cables for connection with the concentrator. Numeral 211 is a bus use request signal line group to the processor 201. Numeral 212 is an information transmission signal line group between the optical arbiter interface 204 and the optical data interface 205. Numeral 219 is a display device, 220 a keyboard, and 221 a disk apparatus, which are generally used in ordinary personal computers, work stations, etc.

Figure 3:
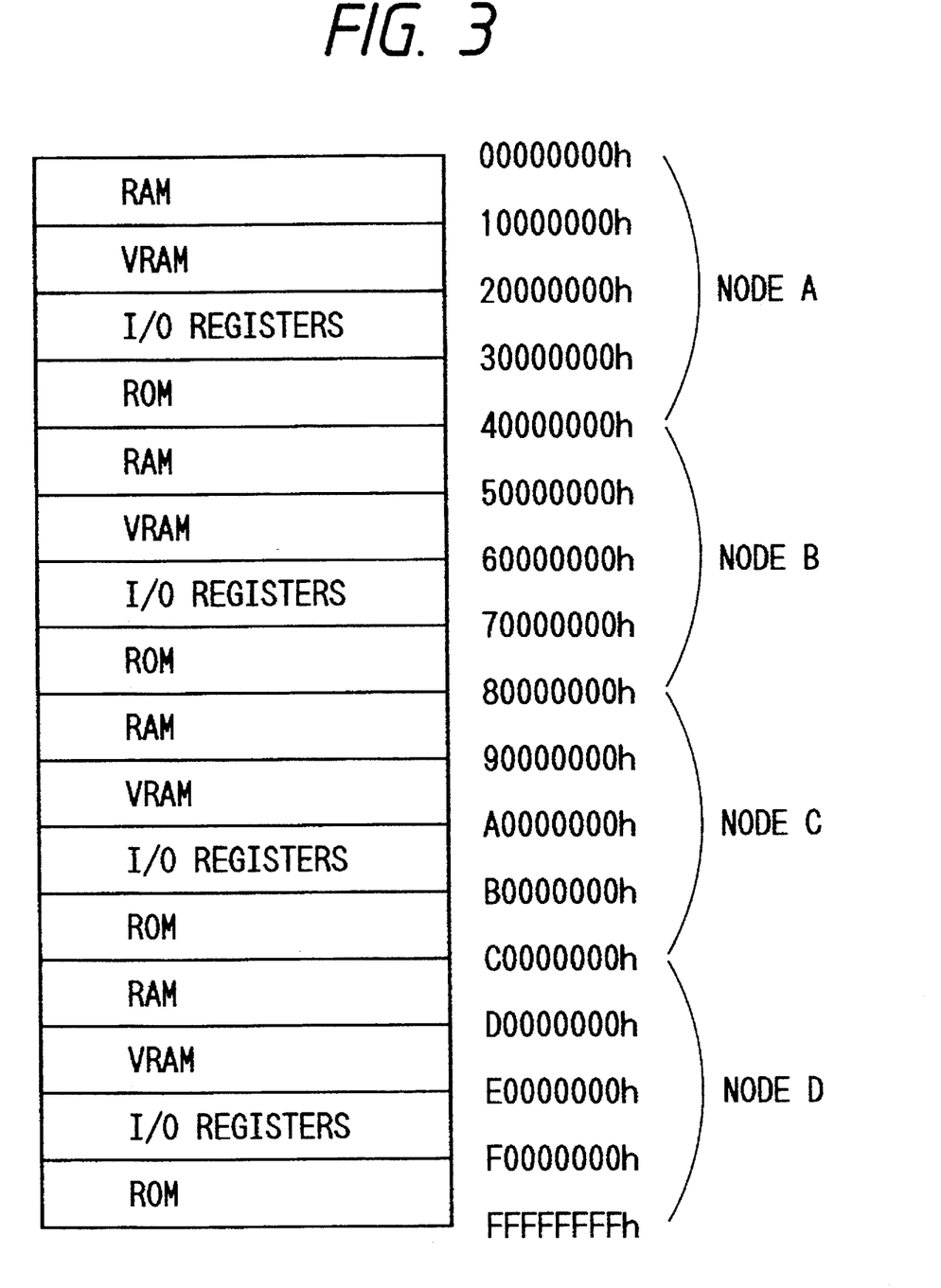
FIG. 3 is a drawing of a system address map.

FIG. 3 is an address map of the entire system. In the present embodiment the address map 4 GB (B: byte) of the entire system is portioned out among the four nodes.

Figure 4:
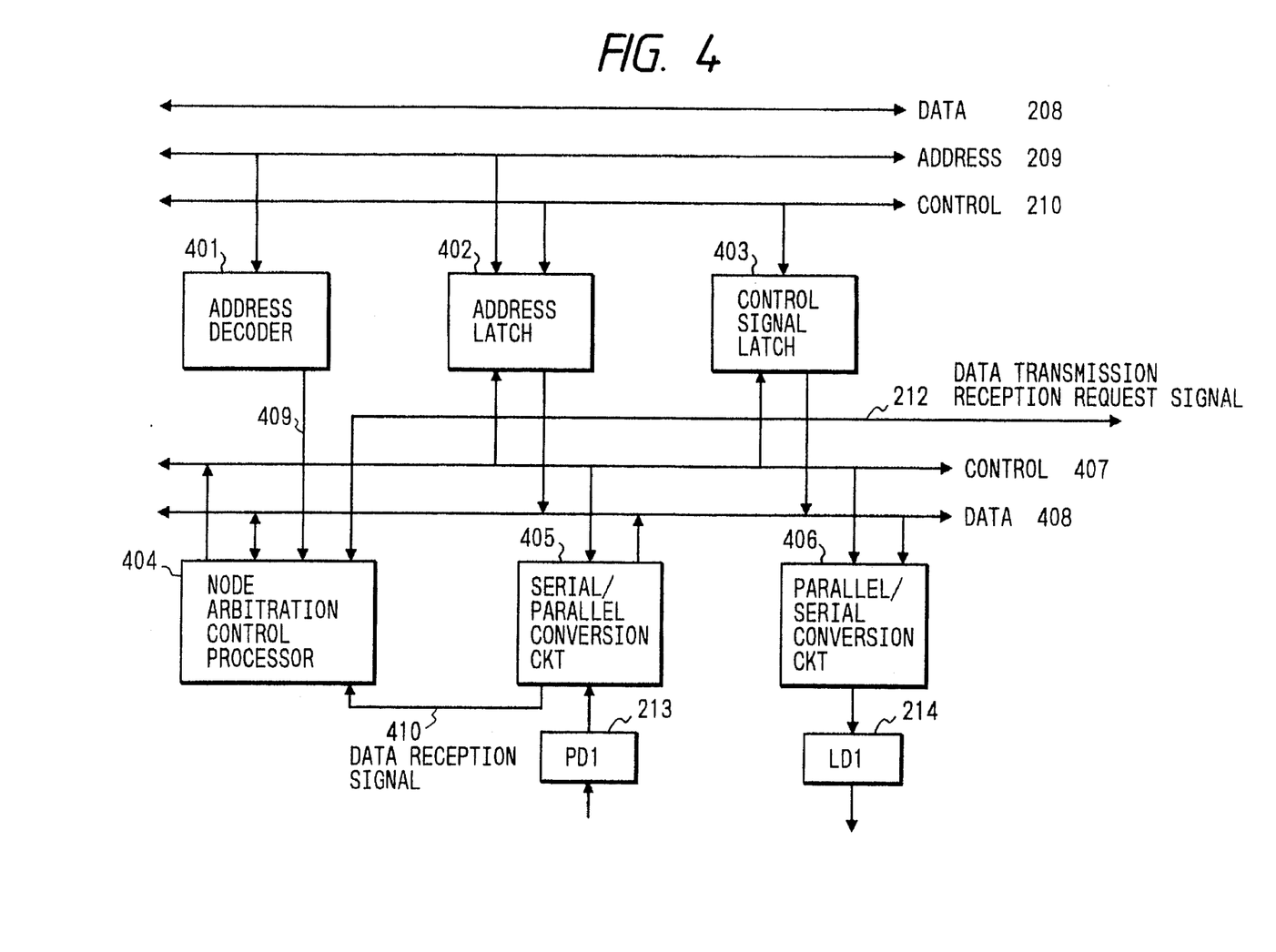
FIG. 4 is a block diagram of an optical arbiter interface.

FIG. 4 is a block diagram of the optical arbiter interface 204. The optical arbiter interface is arranged in the same manner as ordinary memory controllers, i.e., in such a manner that an address decoder 401 for monitoring address information output through the bus detects it if the output address information is to a node other than itself, and notifies a program operating on a node arbitration control processor 404 of it by an external node access detection signal 409. At the same time, an address latch 402 latches the address information and a control signal latch 403 latches a control signal. The present embodiment uses a 1-chip micro controller as the node arbitration control processor 404, which is not limited by the present invention, but it may be constructed of a hardware logic or the like. Numeral 405 is a serial/parallel conversion circuit for converting a serial signal into a parallel signal, 406 a parallel/serial conversion signal for converting a parallel signal into a serial signal, 407 a signal line group for the node arbitration control processor 404 to control the respective modules in the optical arbiter interface 204, 408 a data bus in the optical arbiter interface, and 410 a data reception signal for informing the node arbitration control processor of reception of data.

Figure 7:
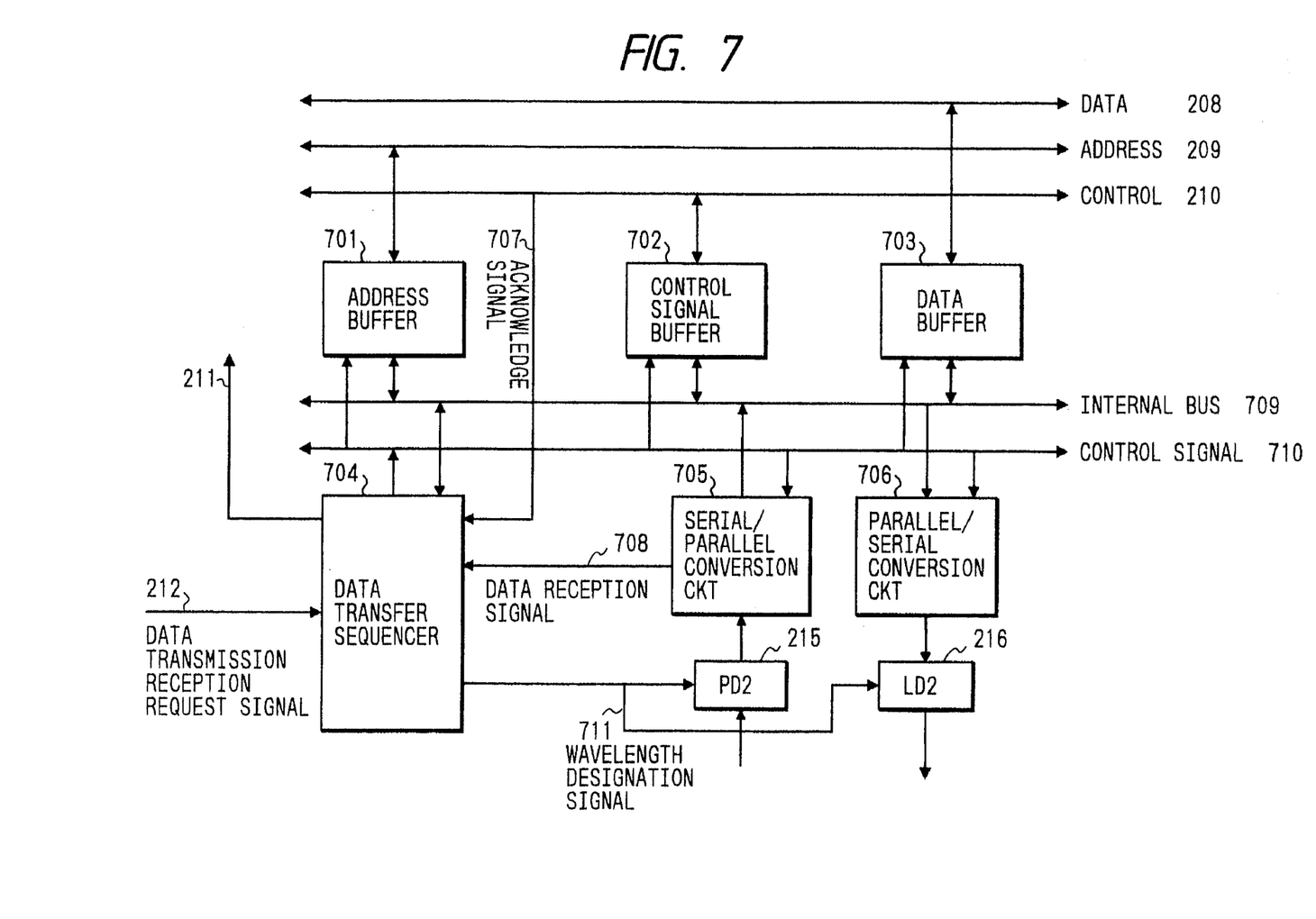
FIG. 7 is a block diagram of an optical data interface.

FIG. 7 is a block diagram of the optical data interface 205. Numeral 701 denotes an address buffer, 702 a control signal buffer, and 703 a data buffer. Numeral 704 is a data transfer sequencer, 705 a serial/parallel conversion circuit, 706 a parallel/serial conversion circuit, 707 an acknowledge signal, 708 a data reception signal, 709 an optical data interface internal bus, and 710 a control signal for the data transfer sequencer to control the respective modules in the optical data interface. Numeral 711 represents a wavelength designation signal for giving a direction to the photodiode 215 about which wavelength signal should be received among a plurality of signals carried on respective wavelengths through the optical fiber cable or a direction to the laser light-emitting device about which wavelength should be used for carrying a signal to be transmitted.

Figure 5:
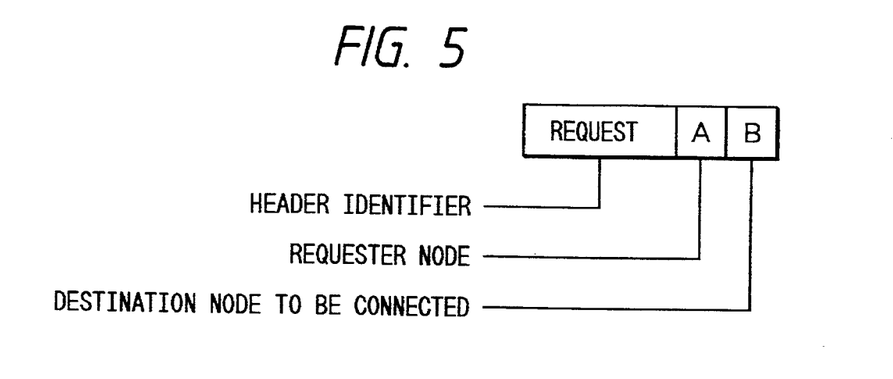
FIG. 5 is a drawing to show an arrangement of a request packet.

Here is explained an operation where the processor 201 in node A 101 reads data of 8 bytes (B) from address 40000000h in RAM in node B 102. The processor 201 in node A 101 acquires a right of using the bus by means of the bus arbitration function of processor, similarly as upon access to RAM in itself, and outputs the access destination address, 40000000h, through the address bus 209 and additional information including a signal indicating a read access, a signal indicating 8B access, etc. through the control bus 210. The address decoder 401 in the optical arbiter interface 204 decodes the address 40000000h sent on the address bus 209 and informs the node arbitration control processor 404 of the fact that an access to an external node is requested, by asserting the external node access detection signal 409. At the same time, the address latch 402 and address buffer 701 latch the address 40000000h sent on the address bus 209, and the control signal latch 403 and control signal buffer 702 latch the additional information including the signal indicating the read access, the signal indicating the 8B access, etc. sent on the control bus 210. When the node arbitration control processor 404 is informed of the fact that an access to an external node is requested, by assertion of external node access detection signal 409, it suitably asserts the control signal line group 407, reads the latched information from the address latch 402 and the control signal latch 403, determines a destination to be connected from the address map of FIG. 3, produces an arbitration request packet (FIG. 5) for requesting connection to node B, and writes the produced packet in the parallel/serial conversion circuit 406. The parallel/serial conversion circuit 406 converts the written information (packet) into serial data to output it to the laser light-emitting device 214. The laser light-emitting device 214 photoelectrically converts the input signal into an optical signal of the arbitration wavelength to output it through the wavelength multiplexer 218 and optical fiber cable 107 to the concentrator 105.

Figure 6:
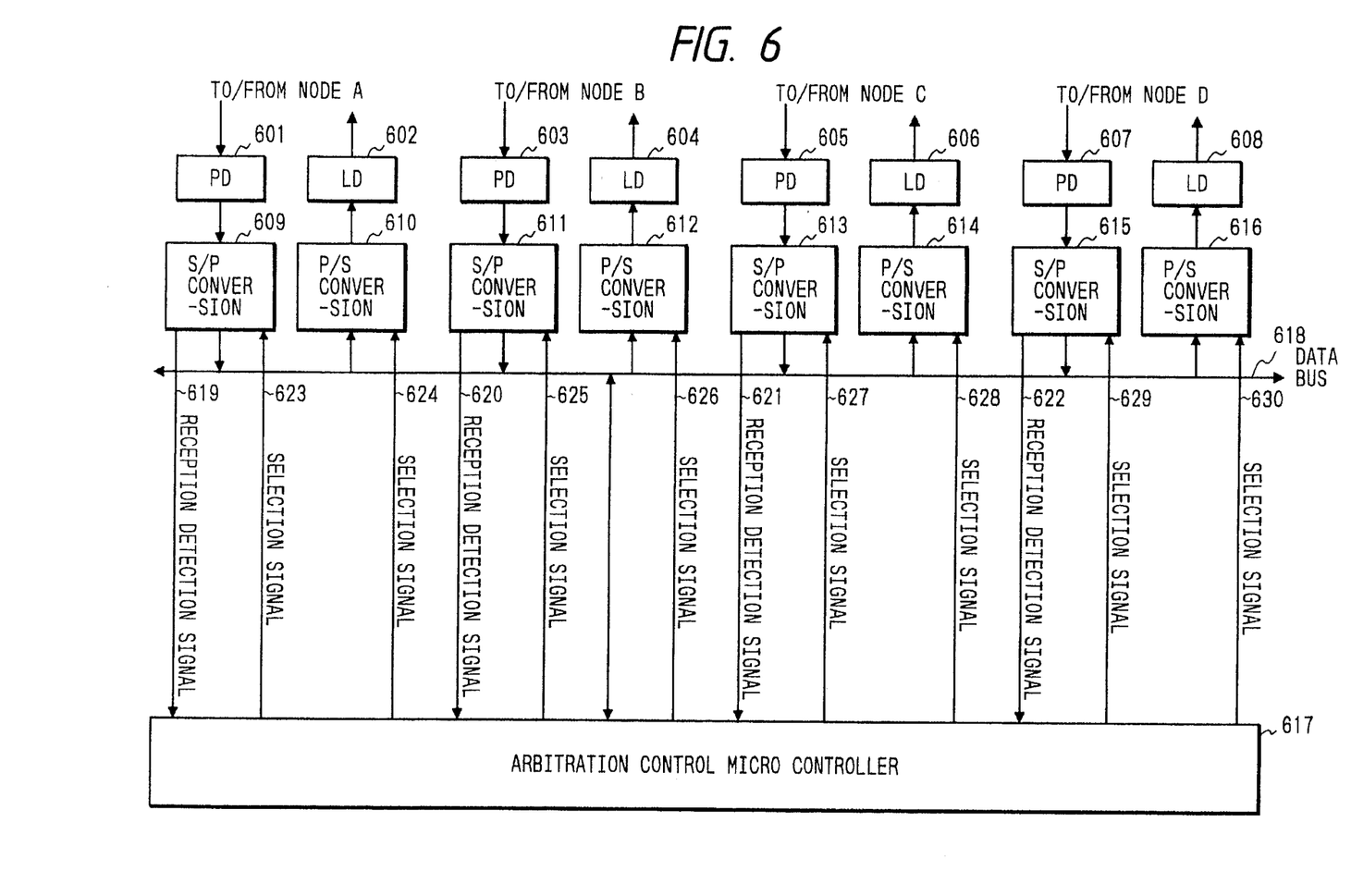
FIG. 6 is a block diagram of an arbiter.

FIG. 6 is a block diagram of the arbiter 122 in the concentrator 105. Numerals 601, 603, 605, 607 are photodiodes, each of which receives an optical signal of the arbitration wavelength demultiplexed by wavelength demultiplexer 118, 119, 120, 121, respectively, in the concentrator 105 to convert it into an electric signal. Numerals 602, 604, 606, 608 are laser light-emitting devices, each of which outputs an optical signal of the arbitration wavelength to wavelength multiplexer 114, 115, 116, 117, respectively. Numerals 609, 611, 613, 615 are serial/parallel conversion circuits, and 610, 612, 614, 616 are parallel/serial conversion circuits. Numeral 617 is an arbitration control micro controller (hereinafter referred to as ACMC). The present embodiment uses a micro controller having built-in program ROM and RAM for work area, as ACMC, but it may be a circuit of discrete structure having the functions as described in the present embodiment, not being limited by the present invention. Numeral 618 represents a data bus in the arbiter 122. Numerals 619, 620, 621, 622 represent reception detection signals for informing ACMC of reception of an arbitration request packet from the respective nodes. Each of numerals 623, 624, 625, 626, 627, 628, 629, 630 is a selection signal for ACMC 617 to select either a serial/parallel conversion circuit or a parallel/serial conversion circuit.

Figure 8:
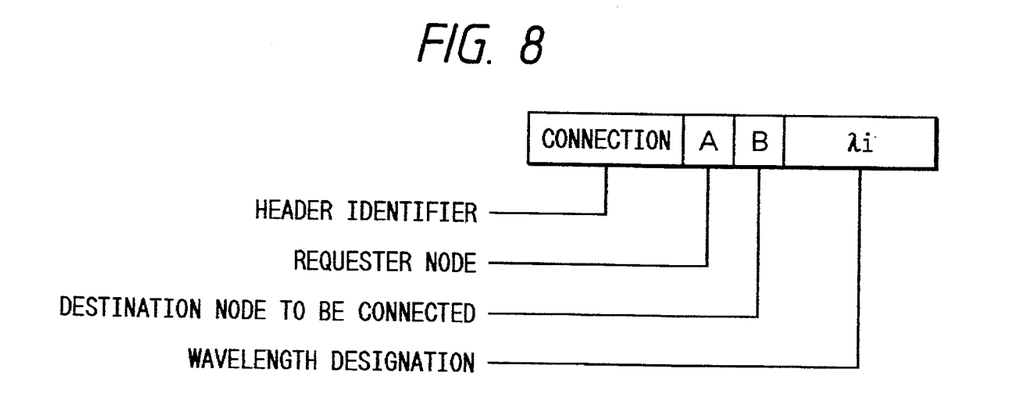
FIG. 8 is a drawing to show an arrangement of a connection request packet.
Figures 9, 10:
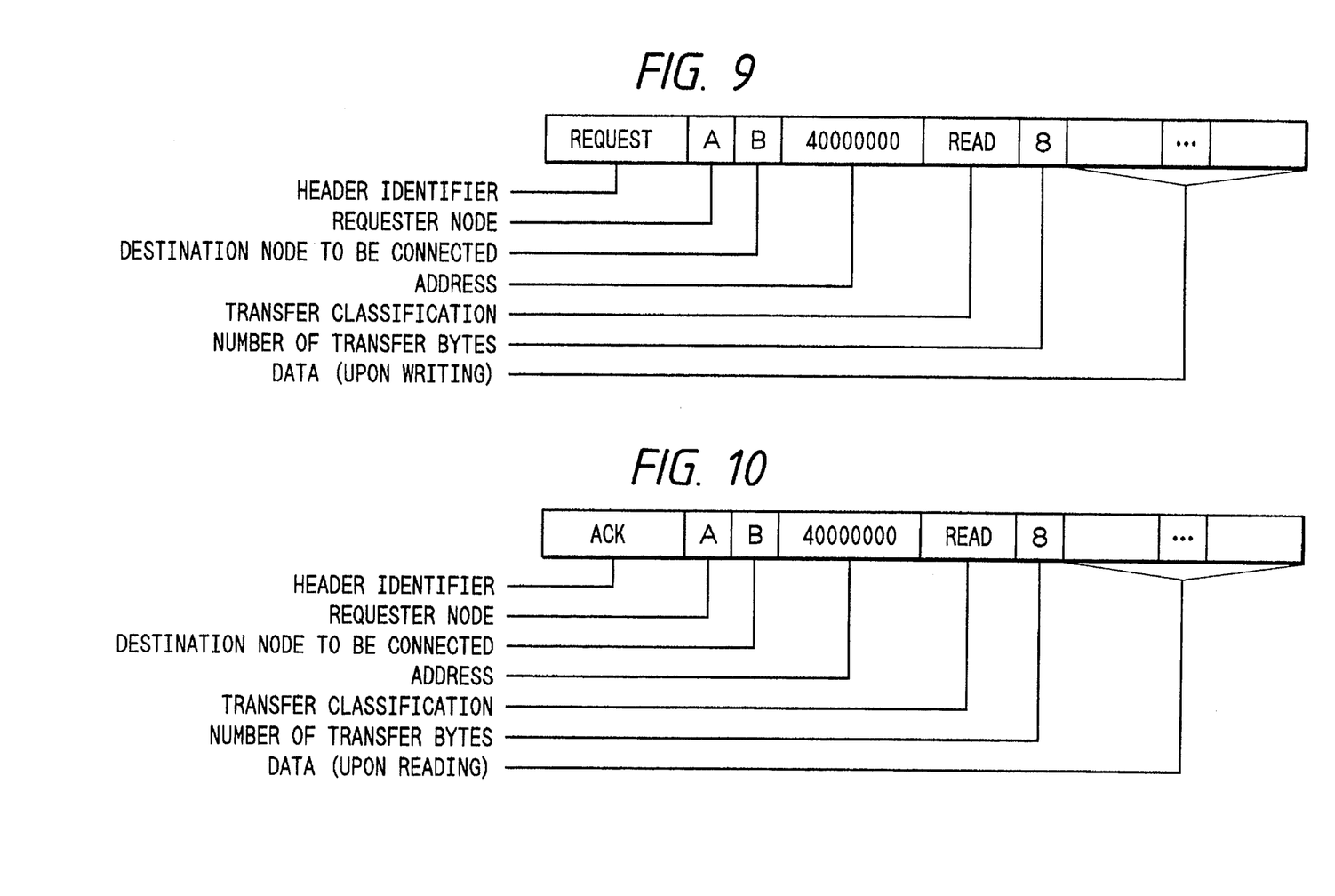
FIG. 9 is a drawing to show an arrangement of an access packet.
FIG. 10 is a drawing to show an arrangement of an acknowledge packet.

Returning to the previous example of operation, the optical signal of arbitration request packet output from node A is received through the wavelength demultiplexer 118 by the photodiode 601. The photodiode 601 performs photoelectric conversion to send the arbitration request packet after conversion into an electric signal to the serial/parallel conversion circuit 609. The serial/parallel conversion circuit 609 converts the received serial data into parallel data and informs ACMC of reception of arbitration request packet by asserting the reception detection signal 619. Then ACMC asserts the selection signal 623 so as to select the serial/parallel conversion circuit 609, thereby reading the arbitration request packet sent from node A through the data bus 618. After that, it analyzes this packet so as to detect that the request for use of the transmission line is a request for connection between node A and node B. ACMC stores on a software basis in the internal RAM a transmission line using state flag representing which nodes are using which wavelength for communication. Referring to this transmission line using state flag, ACMC checks if a destination node to be connected (node B in the case of the present operational example) can receive an access from an external node and which wavelength can be used at present. If node B is in a state that it can receive an access from an external node, ACMC allocates an unused wavelength for connection, produces a connection preparation request packet shown in FIG. 8, writes it in the parallel/serial conversion circuits 610 and 612, and updates the transmission line using state flag into a state that node B is receiving an access from an external node and that the allocated wavelength is in use. When node B cannot receive an access from an external node or when there is no unused wavelength, ACMC stays in an idle state until it detects arrival of an end packet as detailed later or until it detects arrival of another arbitration request packet. At arrival of another arbitration request packet ACMC performs the same arbitration operation. When an end packet concerning the transmission line in connection with node B arrives or when a wavelength becomes open, ACMC similarly produces a connection preparation request packet (FIG. 8), writes it in the parallel/serial conversion circuits 610 and 612, and updates the transmission line using state flag. The parallel/serial conversion circuits each convert the connection preparation request packet thus written into a serial signal. Then the laser light-emitting devices 602 and 604 each convert the serial signal into an optical signal of the arbitration wavelength, and the optical signals are sent through the respective wavelength multiplexers 114 and 115 and optical fiber cables 106 and 108 to node A and node B, respectively. In node A 101 the wavelength demultiplexer 217 demultiplexes the optical signal supplied through the optical fiber cable 106 and the optical signal of the arbitration wavelength is converted by the photodiode 213 into an electric signal, which is sent to the serial/parallel conversion circuit 405 in the optical arbiter interface 204. The serial/parallel conversion circuit 405 converts the serial data into parallel data and asserts the data reception signal 410 to inform the node arbitration control processor 404 of arrival of packet. The node arbitration control processor 404 selects the serial/parallel conversion circuit 405 by the control signal 407 and reads the packet through the data bus 408. Since the packet is a connection preparation request packet, analyzing the packet, the processor can recognize that connection previously requested was permitted, and, using a data transmission reception request signal 212, it gives the optical data interface 205 an instruction that an access packet shown in FIG. 9 is to be sent using the allocated wavelength.

On the other hand, in node B 102 (here, because all nodes have the same structure, the operation in node B is described using FIG. 2 and FIG. 4), the wavelength demultiplexer 217 demultiplexes the optical signal supplied through the optical fiber cable 108, and the photodiode 213 converts the optical signal of the arbitration wavelength into an electric signal, which is sent to the serial/parallel conversion circuit 405 in the optical arbiter interface 204. The serial/parallel conversion circuit 405 converts the serial data into parallel data and asserts the data reception signal 410 to inform the node arbitration control processor 404 of arrival of packet. The node arbitration control processor 404 selects the serial/parallel conversion circuit 405 by the control signal 407 to read the packet through the data bus 408. Since the packet is a connection preparation request packet, the node arbitration control processor 404 analyzes it to inform the optical data interface 205 of the wavelength allocated in the connection preparation request packet and to give it an instruction of reception of packet coming with the wavelength.

The optical data interface 205 in node A 101, based on an instruction by the optical arbiter interface 204, makes the data transfer sequencer 704 assemble an access packet (FIG. 9) from the information latched in the respective buffers 701 to 703 and write it in the parallel/serial conversion circuit 705, and also makes the laser light-emitting device 216 emit light of the allocated wavelength, using the wavelength designation signal 711. The parallel/serial conversion circuit 706 converts the access packet into serial data and outputs it to the laser light-emitting device 216. Performing photoelectric conversion, the laser light-emitting device 216 outputs an optical signal of the allocated wavelength. This optical signal is once sent through the wavelength multiplexer 218 and the optical fiber cable 107 to the concentrator 105. In the concentrator 105 the wavelength demultiplexer 118 demultiplexes the signal to send a signal of the data transfer wavelength to the star coupler 123. The star coupler 123 distributes this optical signal to the respective wavelength multiplexers 114, 115, 116, 117, i.e., to the respective nodes A to D. The optical signal is transmitted through the wavelength multiplexer 115 and the optical fiber cable 108 to node B 102.

The optical data interface 205 in node B 102 is ready for reception of a packet in the wavelength allocated by the connection preparation request packet. The optical signal sent to node B 102 is demultiplexed by the wavelength demultiplexer 217, and a signal of a wavelength other than the wavelength allocated for arbitration is put into the photodiode 215. The photodiode 215 converts the optical signal of the designated wavelength into an electric signal to send it to the serial/parallel conversion circuit 705. The serial/parallel conversion circuit 705 converts the serial data into parallel data and asserts the data reception signal 704 to inform the data transfer sequencer 704 of arrival of packet. The data transfer sequencer 704 reads the packet through the internal bus 709 from the serial/parallel conversion circuit 705, using the control signal 710. Since the packet is an access packet indicating a read access of 8B from address 40000000h, interpreting it, the data transfer sequencer 704 uses the bus use request signal line group 211 to request use of bus to the processor 201 and to set information for access in the respective buffers 701 to 703. Based on the bus use request from the optical data interface 205, the built-in bus arbitration function in the processor 201 gives a right of use of bus to the optical data interface 205 at appropriate timing. Using the control signal 710, the data transfer sequencer 704 in the optical data interface 205, having been permitted to use the bus, sends the access information in the respective buffers 701 to 703 at appropriate timing to satisfy the bus protocols, on the buses 208 to 210, thereby making an access.

In the case of the present operational example, which is the read access of 8B from address 40000000h, pertinent data is sent back from RAM 206. The optical data interface 205 latches the data in the data buffer 703. With assertion of the acknowledge signal 707, the data transfer sequencer 704 having been informed of arrival of data assembles an acknowledge packet shown in FIG. 10 for transmitting the data to node A 101 this time. The acknowledge packet is converted into serial data by the parallel/serial conversion circuit 706, which is sent to the laser light-emitting device 216. The laser light-emitting device 216 once sends the acknowledge packet of serial data in the wavelength previously allocated through the wavelength multiplexer 218 and optical fiber cable 109 to the concentrator 105. In the concentrator 105 the wavelength demultiplexer 119 demultiplexes the data to send a signal of the data transfer wavelength to the star coupler 123. The star coupler 123 distributes this optical signal to the respective wavelength multiplexers 114, 115, 116, 117, that is, it outputs the optical signal to the respective nodes A to D. The optical signal is sent through the wavelength multiplexer 114 and the optical fiber cable 106 to node A 101. The optical data interface 205 in node A 101 is ready to receive a packet in the wavelength allocated by the connection preparation request packet. The optical signal sent to node A 101 is demultiplexed by the wavelength demultiplexer 217, and a signal of a wavelength other than the wavelength allocated for arbitration is sent to the photodiode 215. The photodiode 215 converts the optical signal of the allocated wavelength into an electric signal to send it to the serial/parallel conversion circuit 705. The serial/parallel conversion circuit 705 converts the serial data into parallel data and asserts the data reception signal 708 to inform the data transfer sequencer 704 of arrival of packet. Using the control signal 710, the data transfer sequencer 704 reads the packet through the internal bus 709 from the serial/parallel conversion circuit 705. Since the packet is an acknowledge packet for the previously sent read access packet of 8B from address 40000000h, interpreting it, the data transfer sequencer 704 uses the control signal 710 to transfer data included in the acknowledge packet to the data buffer 703. At the stage of completion of preparation to output the data to the data bus 208, the data transfer sequencer 704 uses the control signal 710 to send the pertinent data onto the data bus 208 and the acknowledge signal onto the control signal bus 210 at appropriate timing to satisfy the respective bus protocols. Receiving this data, the processor 201 continues processing.

Figure 11:
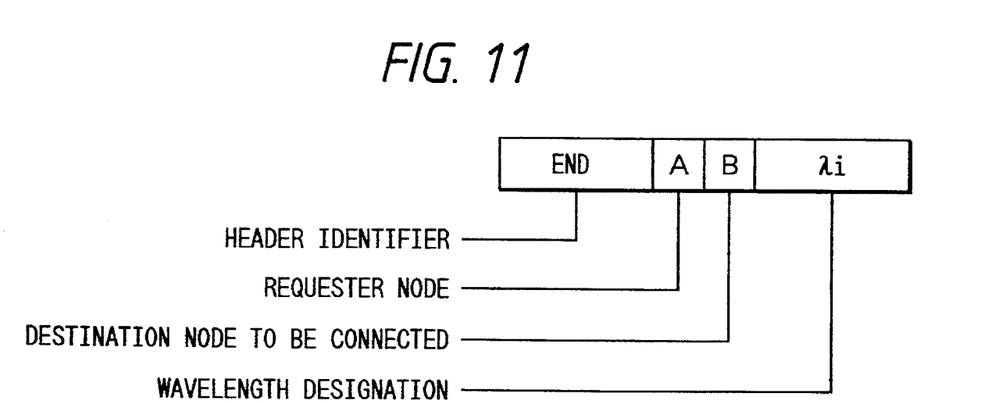
FIG. 11 is a drawing to show an arrangement of an end packet.

After supplying the data to the processor 201, the data transfer sequencer 704 uses the data transmission reception request signal 212 to request the optical arbiter interface 204 to send an end packet shown in FIG. 11. Receiving the request, the node arbitration control processor 404 in the optical arbiter interface 204 assembles an end packet to write it in the parallel/serial conversion circuit 406. The parallel/serial conversion circuit 406 converts the parallel data into serial data to send it to the laser light-emitting device 214.

The laser light-emitting device 214 sends the end packet in the arbitration wavelength through the wavelength multiplexer 218 and optical fiber cable 107 to the arbiter 122 in the concentrator 105. Interpreting it, ACMC 617 in the arbiter 122 makes the transmission line using state flag reflect the fact that transmission is completed between node A 101 and node B 102 and that the allocated wavelength becomes unused.

The above processes conclude the read access processing of 8B data from address 40000000h present in RAM 206 in node B 102, requested by the processor 201 in node A 101. For write access, substantially the same processing procedures are conducted except that the direction of data transfer is reversed. The same processing procedures can be applied not only to the data transfer between node A and node B but also to data transfer between arbitrary nodes.

Other Embodiments

The above embodiment used the optical star coupler as means for connection of signal for data transfer between plural computational nodes, but the present invention is by no means limited to the star-shaped topology of data transfer. The means for connection of signal for data transfer may be an optical switch which can arbitrarily set a destination to be connected or a structure which performs data transfer using an optically coupled circuit other than the star coupler. It is also logically possible in the structure of FIG. 1 that without using the star coupler in the concentrator, data transfer is performed in loop or ring structure by such a connection arrangement to send data in a predetermined order that, for example, a data transfer signal among two signals demultiplexed from an input signal from node A is put into a wavelength multiplexer associated with node C, a data transfer signal among two signals demultiplexed from an input signal from node C is put into a wavelength multiplexer associated with node D, continuing similarly, a data transfer signal from node D is put into a wavelength multiplexer associated with node B, and a data transfer signal from node B is put into a wavelength multiplexer associated with node A.

As described above, the parallel computer system for interconnecting a plurality of computational nodes by an interconnecting network is so arranged that optical fiber cables are used as transmission line media in the interconnecting network, means is provided for wavelength-multiplexing a plurality of information to transmit the thus multiplexed data on respective wavelengths, and part of plural wavelengths are used for transmission of arbitration signal and the other wavelengths for data transmission whereby a single optical fiber cable can be used for both signal transmission for arbitration and signal transmission for data transfer, thus presenting an effect that the number of connection lines between the respective computational nodes and the concentrator can be decreased.

What is claimed is:

1. An information processing apparatus having a plurality of computational nodes, comprising:

a plurality of computational nodes, each computational node being provided with at least one wavelength multiplexer for multiplexing signals of a plurality of wavelengths and simultaneously transmitting the multiplexed signals and at least one wavelength demultiplexer for demultiplexing the transmitted signals in the plurality of wavelengths; and a concentrator connected through a transmission line medium with each of said plurality of computational nodes, said concentrator comprising, a wavelength demultiplexer for demultiplexing the signals of the plurality of wavelengths transmitted through said wavelength multiplexer from each of said plurality of computational nodes;

a wavelength multiplexer for multiplexing signals of the plurality of wavelengths and simultaneously transmitting the multiplexed signals to each of said plurality of computational nodes;

connecting means for connection of a signal for data transfer between said plurality of computational nodes connected with each other; and an arbiter for performing an arbitration operation for use of the transmission line in said data transfer;

wherein a signal for arbitration for use of the transmission line transmitted between said computational nodes and the arbiter and the signal for data transfer between the computational nodes are transmitted in a multiplexed manner on said transfer line medium.

2. An information processing apparatus according to claim 1, wherein said means for connection of the signal for data transfer is means for distributing the signal for data transfer from the each computational node to a plurality of computational nodes.

3. An information processing apparatus according to claim 2, wherein said means for distributing the signal for data transfer from the each computational node to a plurality of computational nodes is a star coupler.

* * * * *

UNITED STATES PATENT AND TRADEMARK OFFICE
CERTIFICATE OF CORRECTION

PATENT NO. : 5,602,663
DATED : February 11, 1997
INVENTOR(S) : KAZUMASA HAMAGUCHI, ET AL.

It is certified that error appears in the above-indentified patent and that said Letters Patent is hereby corrected as shown below:

ON THE TITLE PAGE:

Item [56] References Cited U.S. PATENT DOCUMENTS:

"Mc Mahon" should read --McMahon--.

Item [56] References Cited OTHER PUBLICATIONS:

"Kightwave-Technol-" should read --Lightwave Technol- --;
"Opteelechonk Pailut" should read
    --Optoelectronic Packet--;
"international" should read --International--; and
"Kazovsky et al, "Starnet:" should read
    --Kazovsky et al., "STARNET:".

COLUMN 10

Line 2, delete "the"; and
Line 6, delete "the".

Signed and Sealed this

Second Day of September, 1997

Attest:

BRUCE LEHMAN

Attesting Officer

Commissioner of Patents and Trademarks